United States Patent [19]
Ogura et al.

[11] Patent Number: 5,535,030
[45] Date of Patent: Jul. 9, 1996

[54] LCD HAVING AN OVERCOAT FILM ONLY OVER A DISPLAY PORTION AND EITHER AN ELECTRODE TERMINAL OR A SEAL PORTION

[75] Inventors: Masami Ogura, Kashihara, Japan; Hiroshi Takanaski, Kyoto, both of Japan

[73] Assignee: Sharp Kabushiki Kaisha, Osaka, Japan

[21] Appl. No.: 134,885

[22] Filed: Oct. 13, 1993

[30] Foreign Application Priority Data

Nov. 30, 1992 [JP] Japan .................................. 4-320473

[51] Int. Cl.⁶ .................................................. G02F 1/1333
[52] U.S. Cl. .................................................. 359/74; 359/80
[58] Field of Search .................................. 359/68, 74, 80, 359/88

[56] References Cited

U.S. PATENT DOCUMENTS

| | | | |
|---|---|---|---|
| 4,929,060 | 5/1990 | Sugimoto et al. | 359/68 |
| 5,078,475 | 1/1992 | Sekimura et al | 359/68 |
| 5,079,214 | 1/1992 | Long et al. | 359/68 |
| 5,128,786 | 7/1992 | Yanagisawa | 359/68 |
| 5,157,527 | 10/1992 | De Keyzer et al. | 329/74 |
| 5,166,125 | 11/1992 | Harrison et al. | 430/7 |
| 5,166,126 | 11/1992 | Harrison et al. | 430/7 |
| 5,194,976 | 3/1993 | Nakano et al. | 359/68 |

FOREIGN PATENT DOCUMENTS

| | | |
|---|---|---|
| 57-168203 | 10/1982 | Japan . |
| 291614 | 3/1990 | Japan . |
| 299925 | 4/1990 | Japan . |
| 3186814 | 8/1991 | Japan . |
| 4204825 | 7/1992 | Japan ...................... 359/74 |

*Primary Examiner*—Anita Pellman Gross
*Assistant Examiner*—Toan Ton

[57] ABSTRACT

In a color liquid crystal display device, an overcoat film covering color filters on a glass substrate is formed only in a display part of a liquid crystal cell and its vicinity, and not formed in a seal part and an electrode terminal part. The cell gap near a seal member is uniform, which makes it possible to prevent lowering of display quality such as light penetration and uneven lighting, and separation between the glass substrate and seal member. Moreover, the resistance of the electrode terminal part against flaw and impact is increased, and peeling of transparent electrodes in the electrode terminal part is prevented, so that the productivity and reliability may be enhanced. Still more, if disconnection of the lead compression-bonded to the electrode terminal part should occur, the lead can be compression-bonded to the transparent electrodes. Therefore, the length of the electrode terminal part in the outward direction can be shortened, so that the device may be composed in a compact design.

2 Claims, 9 Drawing Sheets

LCD HAVING AN OVERCOAT FILM ONLY OVER A DISPLAY PORTION AND EITHER AN ELECTRODE TERMINAL OR A SEAL PORTION

BACKGROUND OF THE INVENTION

1. Field of the Invention

The present invention relates to a color liquid crystal display device used as display device for consumer and industrial information appliances such as word processor and personal computer, or as display device for liquid crystal television or the like.

2. Description of the Related Art

FIG. 8 is a sectional view of a conventional color liquid crystal display device 50. A liquid crystal cell 51 for composing the color liquid crystal display device 50 is basically composed of a pair of light permeable glass substrates 52, 53, and a nematic liquid crystal layer 54 interposing between these glass substrates 52, 53. A transparent electrode 55 and an orientation film 56 are sequentially formed on a surface 52a of one glass substrate 52 confronting the other glass substrate 53.

On a surface 53a of the other glass substrate 53 confronting the glass substrate 52, a color filter 57, an overcoat film 58, a transparent electrode 59, and an orientation film 60 are sequentially formed. A seal member 62 is annularly interspacing the mutually confronting surfaces 52a, 53a of the glass substrates 52, 53, and a mixed liquid crystal is injected in a space 61 between the surfaces 52a, 53a, thereby forming the nematic liquid crystal layer 54.

On the transparent electrode 59 in an electrode terminal part 63 of thus formed liquid crystal cell 51, a lead 64 of TAB (tape automated bonding) for input of driving signal is compression-bonded, and a connection terminal is formed.

Thus, in the conventional color liquid crystal display device 50, since it is difficult to form the transparent electrode 59 directly on the color filter 57, in order to enhance a smoothness and adhesion, the overcoat film 58 is formed on the entire of the surface 53a of the glass substrate 53 on which the color filter 57 is formed, and then the transparent electrode 59 is formed on the overcoat film 58.

However, the overcoat film 58 is lower in strength as compared with the glass substrate 53 and transparent electrode 59 and is vulnerable to flaw and impact, and moreover the adhesion of the overcoat film 58 and the surface 53a of the glass substrate 53 are easily affected by the residue of the glass substrate 53 which is the base surface, and fluctuations of the adhesion are significant.

Therefore, in the manufacturing process, for example, disconnection may occur in the transparent electrode 59 of the electrode, terminal part 63, or peeling may occur between the overcoat-film 58 and the surface 53a of the glass substrate 53 in the region of the seal member 62 disposed on the glass substrate 53 through the transparent electrode 59 and overcoat film 58, which is a cause to lower the productivity and reliability. If the lead 64 is peeled off the glass substrate 53 together with the transparent electrode 59 and overcoat film 58 in the electrode terminal part 63, or if peeled off with a part of the overcoat film 58 and transparent electrode 59 left over on the glass surface 53, the lead 64 cannot be compression-bonded to the transparent electrode 59 again at the same position, which requires repairing for compression-bonding of the lead 64 again on the transparent electrode 59 through the overcoat film 58 remaining on the glass substrate 53. Allowing for such repair, the electrode terminal part 63 must be set longer than the length necessary for compression-bonding the lead 64.

Furthermore, in the region 65 of the seal member 62 disposed on the glass substrate 53 through the transparent electrode 59 and overcoat film 58, a fluctuation may occur in the film thickness D2 of the overcoat film 58, and accordingly the cell gap near the seal member 62 may be uneven, which may cause lowering of the display quality such as light penetration and uneven lighting.

SUMMARY OF THE INVENTION

It is hence a primary object of the invention to present a color liquid crystal display device capable of enhancing the strength to flaw or impact in the electrode terminal part, preventing peeling of the transparent electrode in the electrode terminal part, having a compact structure, preventing separation between the seal member and glass substrate in the region of the seal member disposed on the glass substrate through the transparent electrode, preventing lowering of display quality near the seal member, and thereby enhancing the productivity and reliability.

To achieve the above object, the invention presents a color liquid crystal display device comprising a pair of light permeable substrates glued together through a seal member, a transparent electrode and an orientation film formed successively on the surface of one substrate confronting the other substrate, a color filter, an overcoat film, a transparent electrode, and an orientation film formed successively on the surface of the other substrate confronting the one substrate, and a liquid crystal layer formed in a free space formed by the pair of substrates and the seal member, the overcoat film not being formed in the region of the seal member disposed on the other substrate and/or the region outward of the liquid crystal layer than the seal member.

According to the invention, since, on the other substrate on the surface of which a color filter is formed, the overcoat film is not formed in the region of the seal member disposed on the other substrate and/or the region of the outside of the seal member, the following operation is brought about.

That is, when the overcoat film is not formed in the region of the seal member disposed on the other substrate, the film thickness between the seal member and the other substrate is constant, and the cell gap near the seal member is uniform, which prevents lowering of the display quality, and moreover, since the seal member is formed on the other substrate through the transparent electrode without intervening overcoat film, separation of the seal member and glass substrate is prevented, and the productivity and reliability are enhanced.

Besides, when the overcoat film is not formed in the region outside the seal member, that is, in the electrode terminal part, since the transparent electrode is formed directly on the other substrate, the adhesion of the transparent electrode is enhanced. Therefore, the resistance of the electrode terminal part against flaw or impact is enhanced, and peeling of the transparent electrode in the electrode terminal part is prevented, which improves the productivity and reliability. Moreover, in the manufacturing process, for example, if disconnection of the leads compression-bonded to the electrode terminal part should occur, the transparent electrode is hardly separated, so that the leads may be compression-bonded to the transparent electrodes. Therefore, the length of the electrode terminal part in the outward direction may be shortened, so that the device may be composed in a compact design.

According to the invention, therefore, the following effects are brought about.

That is, when the overcoat film is not formed in the region of the seal member disposed on the other substrate, the cell gap near the seal member is uniform, which prevents lowering of the display quality, and moreover peeling of the seal member and glass substrate is prevented, so that the productivity and reliability are enhanced.

Besides, when it is not formed in the region outside the seal member, that is, in the electrode terminal part, since the transparent electrode is formed directly on the other substrate, the adhesion of the transparent electrode is enhanced. Therefore, the resistance of the electrode terminal part against flaw or impact is enhanced, and peeling of the transparent electrode in the electrode terminal part is prevented, which improves the productivity and reliability. Moreover, in the manufacturing process, for example, if disconnection of the leads compression bonded to the electrode terminal part should occur, the transparent electrode is hardly separated, so that the leads may be compression-bonded to the transparent electrodes. Therefore, the length of the electrode terminal part in the outward direction may be shortened, so that the device may be composed in a compact design.

The invention also presents a color liquid crystal display device comprising a pair of light permeable substrates glued together through a seal member, a transparent electrode and an orientation film formed successively on the surface of one substrate confronting the other substrate, a color filter, an overcoat film, a transparent electrode, and an orientation film formed successively on the surface of the other substrate confronting the one substrate, and a liquid crystal layer formed in a free space formed by the pair of substrates and the seal member, the overcoat film being formed only in the region inside the seal member disposed on the other substrate.

The invention moreover presents a color liquid crystal display device comprising a pair of light permeable substrates glued together through a seal member, a transparent electrode and an orientation film formed successively on the surface of one substrate confronting the other substrate, a color filter, an overcoat film, a transparent electrode, and an orientation film formed successively on the surface of the other substrate confronting the one substrate, and a liquid crystal layer formed in a free space formed by the pair of substrates and the seal member, the overcoat film being formed in the remaining region excluding the region of the seal member disposed on the other substrate.

The invention further presents a color liquid crystal display device comprising a pair of light permeable substrates glued together through a seal member, a transparent electrode and an orientation film formed successively on the surface of one substrate confronting the other substrate, a color filter, an overcoat film, a transparent electrode, and an orientation film formed successively on the surface of the other substrate confronting the one substrate, and forming a liquid crystal layer in a free space formed by the pair of substrates and the seal member, the overcoat film being formed in the region of the seal member disposed on the other substrate and the region inside this region.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
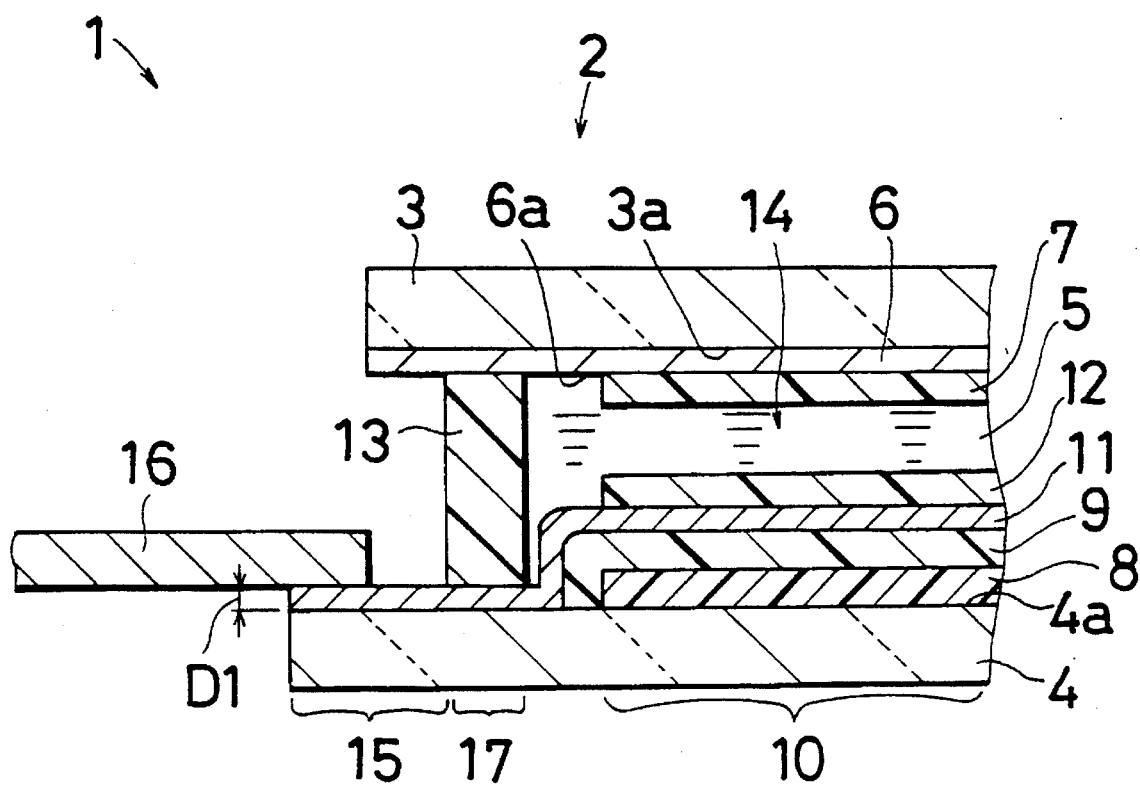
FIG. 1 is a sectional view of a color liquid crystal display device 1 in an embodiment of the invention.

Now referring to the drawing, preferred embodiments of the invention are described below.

FIG. 1 is a sectional view of a color liquid crystal display device 1 in an embodiment of the invention. A liquid crystal cell 2 composing the color liquid crystal display device 1 is basically composed of a pair of glass substrates 3, 4 which are light permeable substrates, and, for example, a nematic liquid crystal layer 5 interspacing between the glass substrates 3, 4.

On the lower surface 3a of one glass substrate 3 in FIG. 1, though simplified in the drawing, a plurality of band-shaped transparent electrodes 6 made of indium oxide doped with tin oxide (ITO) film or the like and extending in the vertical direction to the surface of the paper are formed parallel at specific intervals, and an orientation film 7 made of polyimide resin or the like is formed on the surface 6a of the transparent electrodes 6.

On the upper surface 4a of the other glass substrate 4 in FIG. 1, also simplified in FIG. 1, color filters 8 of three primaries, red (R), green (G) and blue (B), in rectangular shape are individually formed for every pixel. On the color filters 8, an overcoat film 9 made of acrylic resin or the like is formed,. What is of note here is that the overcoat film 9 is formed only in the display part 10 of the liquid crystal cell 2 and its vicinity.

On the surface of the overcoat film 9, although simplified in FIG. 1, a plurality of band-shaped transparent electrodes 11 made of ITO film are formed parallel to each other at specific intervals, orthogonally to the row of the transparent electrodes 6. On the surface of the transparent electrodes 11, an orientation film 12 made of polyimide resin or the like is formed corresponding to the orientation film 7.

Between the mutually confronting surfaces 3a, 4a of the glass substrates 3, 4, a seal member 13 made of epoxy compound or the like is annularly formed, and in the space 14 between the surfaces 3a, 4a, a mixed liquid crystal made of phenylcyclohexane compound or the like is injected, thereby the nematic liquid crystal layer 5 is formed.

In an electrode terminal part 15 outside the seal member 13 of liquid crystal cell 2 thus formed, a lead 16 of TAB for input of driving signal is compression-bonded, and a connection terminal is formed.

In the embodiment, the overcoat film 9 is formed only in the display part 10 of the liquid crystal cell 2 and its vicinity, and is not formed in the region (or the seal part) 17 of the seal member 13 disposed on the glass substrate 4 through the transparent electrode 11 or in the electrode terminal part 15.

Therefore, according to the invention, since the film thickness D1 between the seal member 13 and glass substrate 4 is constant, the cell gap near the seal member 13 is uniform, and lowering of display quality such as light penetration and uneven lighting may be prevented, and moreover since the seal member 13 is formed on the glass substrate, in the seal part 17, through the transparent electrode 11 without intervening overcoat film 9, peeling of the seal member 13 and glass substrate 4 is prevented, so that the productivity and reliability may be enhanced.

Still more, since the adhesion of the transparent electrodes 11 in the electrode terminal part 15 is increased, the resistance against flaw or impact in the electrode terminal part 15 may be enhanced, and peeling of the transparent electrodes 11 in the electrode terminal part 15 may be prevented, so that the productivity and reliability may be improved. Further, for example, in the manufacturing process, if disconnection of the leads 16 compression-bonded to the electrode terminal part 15 should occur, since the transparent electrodes 11 are hardly separated, the leads 16 can be compression-bonded to the transparent electrodes 11. Therefore, the length of the electrode terminal part 15 in the outward direction can be shortened, so that the device may be composed in a compact design.

The color liquid crystal display device 1 according to the embodiment is thus composed, and the manufacturing process of this color liquid crystal display device 1 is described below by referring to the accompanying drawings.

Figure 2:
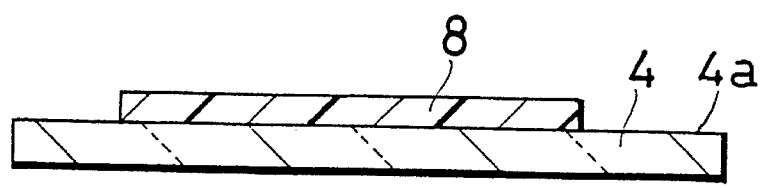
FIG. 2 (A) to 2(F) are sectional views showing the manufacturing process of the color liquid crystal display device 1 by printing method.
Figure 2:
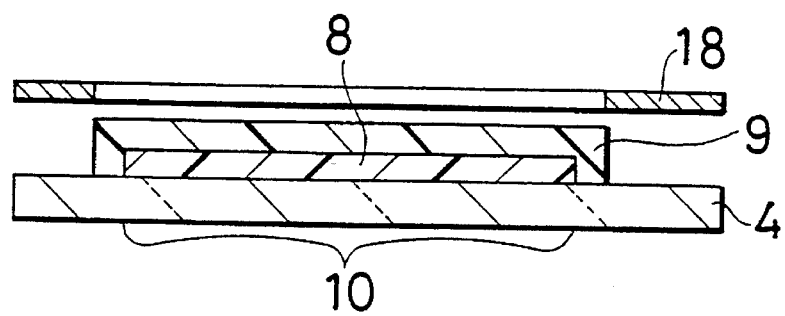
Figure 2:
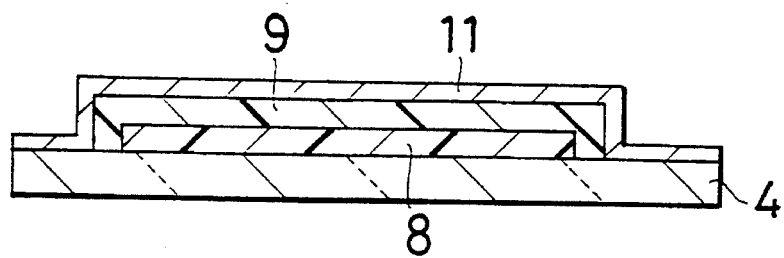
Figure 2:
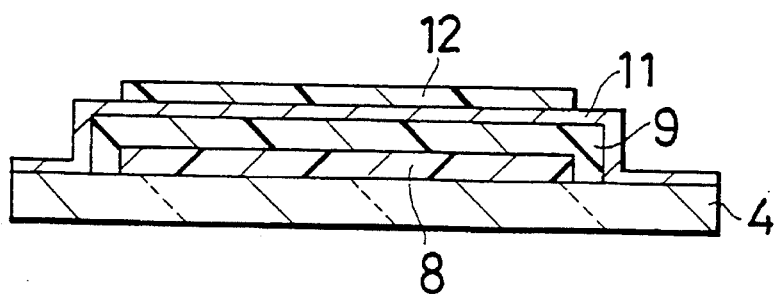
Figure 2:
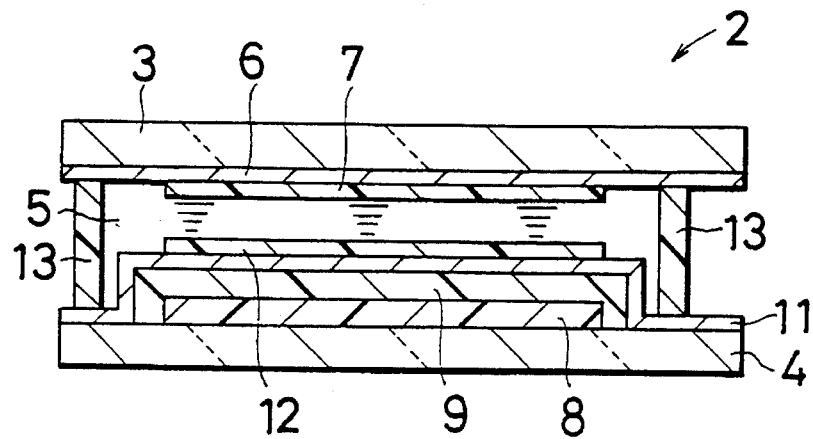
Figure 2F:
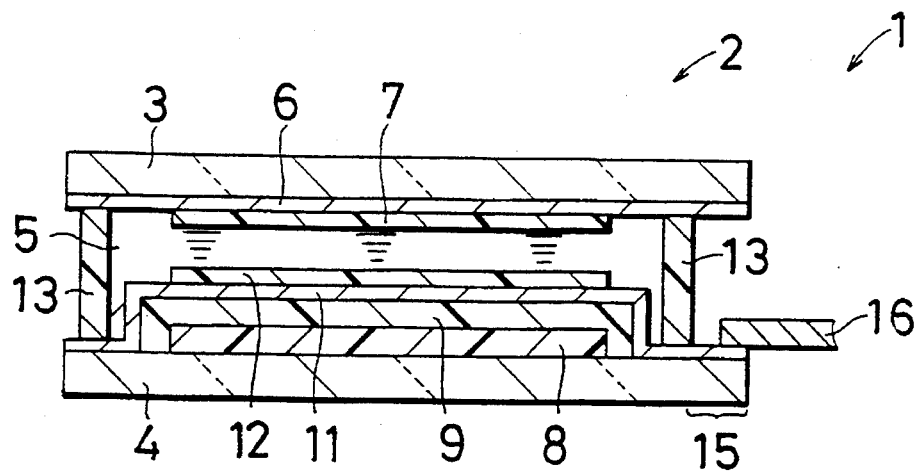
Figure 3:
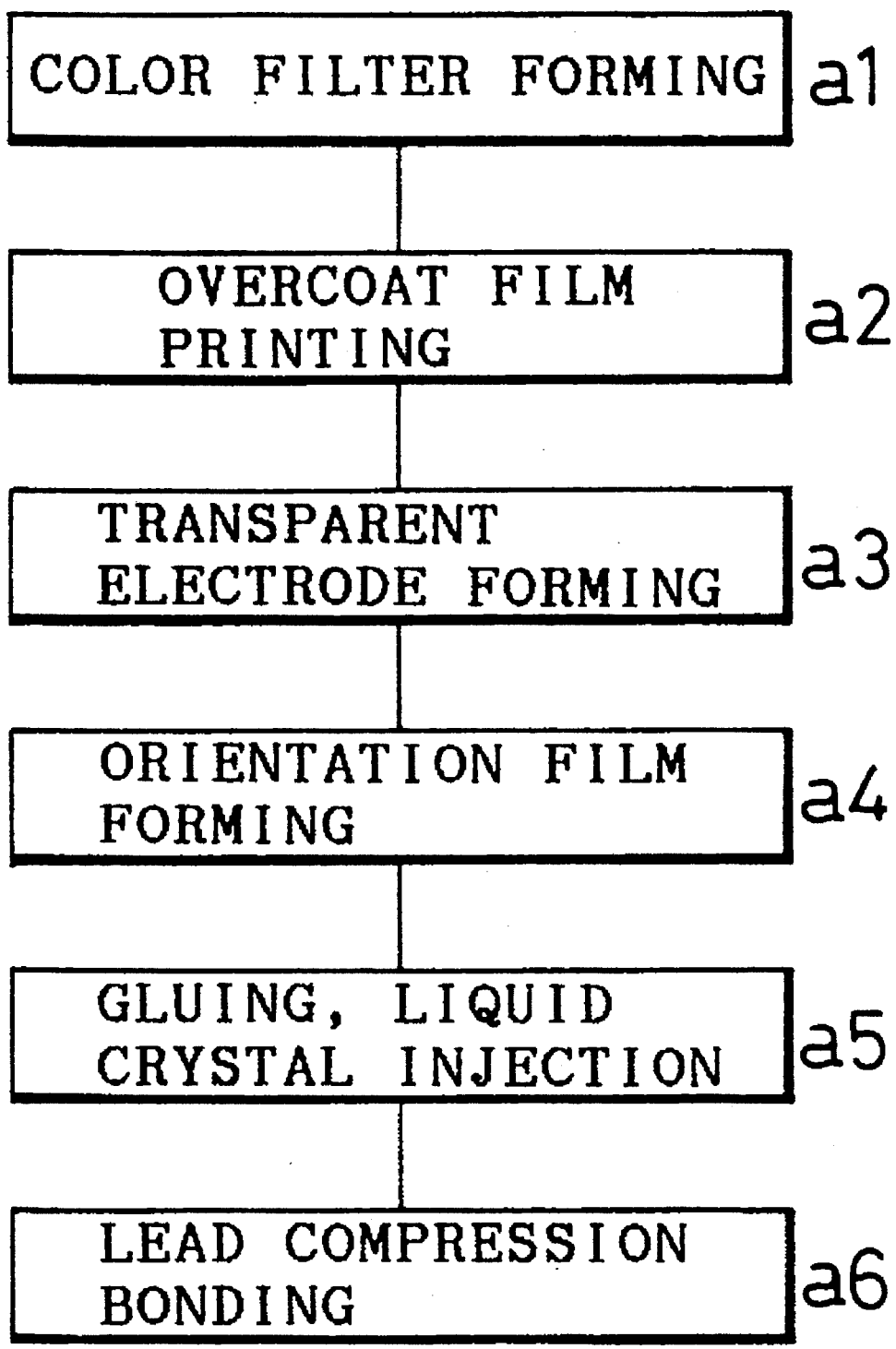
FIG. 3 is a process chart showing the flow of the process in FIG. 2.

FIG. 2 is a sectional view showing the manufacturing process of the color liquid crystal display device 1 by the printing method, and FIG. 3 is a process chart showing the flow of the process in FIG. 2.

First, at process step a1 in FIG. 3, as shown in FIG. 2 (A), color filters 8 of three primaries, red (R), green (G) and blue (B), are successively formed on the surface 4a of the glass substrate 4 by electrodeposition or other method.

At process step a2, as shown in FIG. 2 (B), after coated with a pattern mask 18, an overcoat film 9 (film thickness about 2 to 3 μm) is selectively printed in the display part 10 and its vicinity by mesh screen printing or the like, and is heat-cured.

At process step a3, as shown in FIG. 2 (C), an ITO film (film thickness about 2000 to 2500 Å) is formed nearly on the entire of the surface 4a of the glass substrate 4 by sputtering or CVD method, and the ITO film is patterned by photo etching or the like, thereby transparent electrodes 11 is formed.

At process step a4, as shown in FIG. 2 (D), an orientation film 12 made of polyimide resin or the like is formed on the transparent electrode 11, and is rubbed. On the other hand, on the surface 3a of the other glass substrate 3, similarly, transparent electrodes 6 and orientation film 7 are successively formed and rubbed.

At process step a5, as shown in FIG. 2 (E), a seal member 13 is printed on the glass substrate 4 on which the transparent electrodes are disposed as common electrodes. Subsequently, via an intervening spacer not shown in FIG. 2(E), the glass substrates 3, 4 are glued together, and are heated in concurrence with, pressurizing properly, and the seal member 13 is cured to form the liquid crystal cell 2. Afterwards, through a liquid crystal injection port not shown in FIG. 2(E), the liquid crystal cell 2 is evacuated, and a mixed liquid crystal composed of phenylcyclohexane compound and others is injected, and a nematic liquid crystal layer 5 is formed, and the liquid crystal injection port is sealed with silicon adhesive or the like.

Finally, at process step a6, as shown in FIG. 2 (F), a conductive adhesive layer is formed on the transfer terminal for common electrodes preliminarily formed on the glass substrate 4 on which the transparent electrodes 11 are disposed, and the lead 16 of TAB for input of driving signal is compression bonded to form a connection terminal, thereby the color liquid crystal display device 1 is formed.

Figure 4:
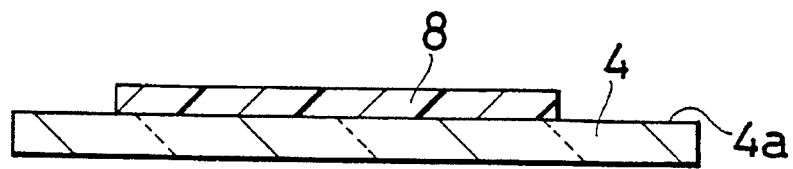
FIG. 4 (A) to 4(F) are sectional views showing the manufacturing process of the color liquid crystal display device 1 by photo patterning method.
Figure 4:
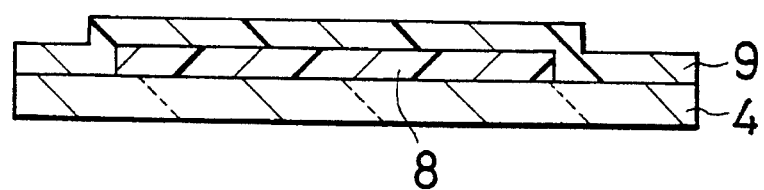
Figure 4:
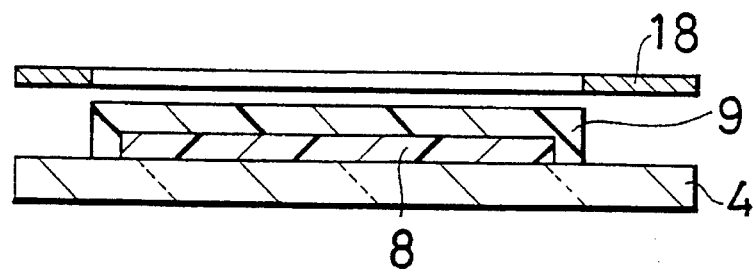
Figure 4:
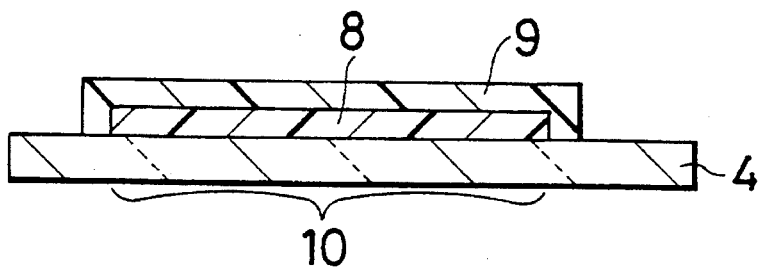
Figure 4:
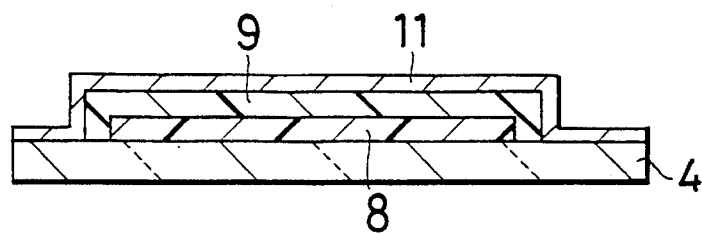
Figure 4:
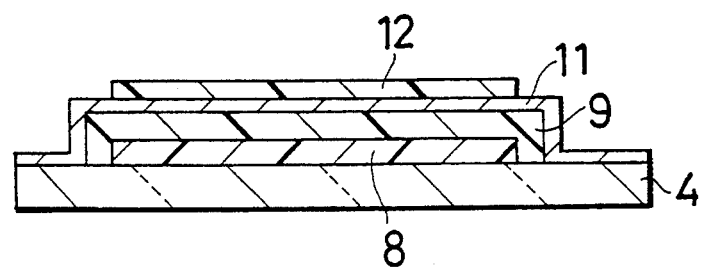
Figure 4:
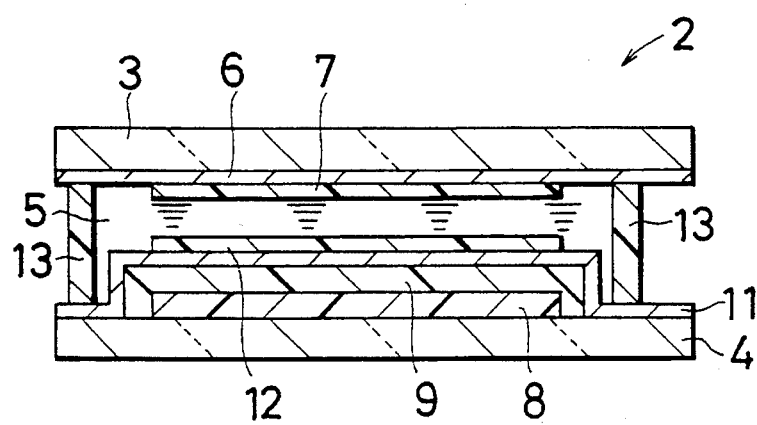
Figure 4:
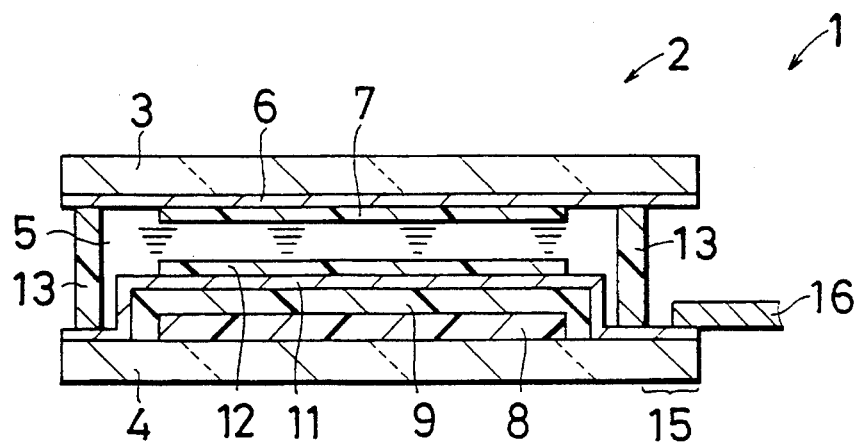
Figure 5:
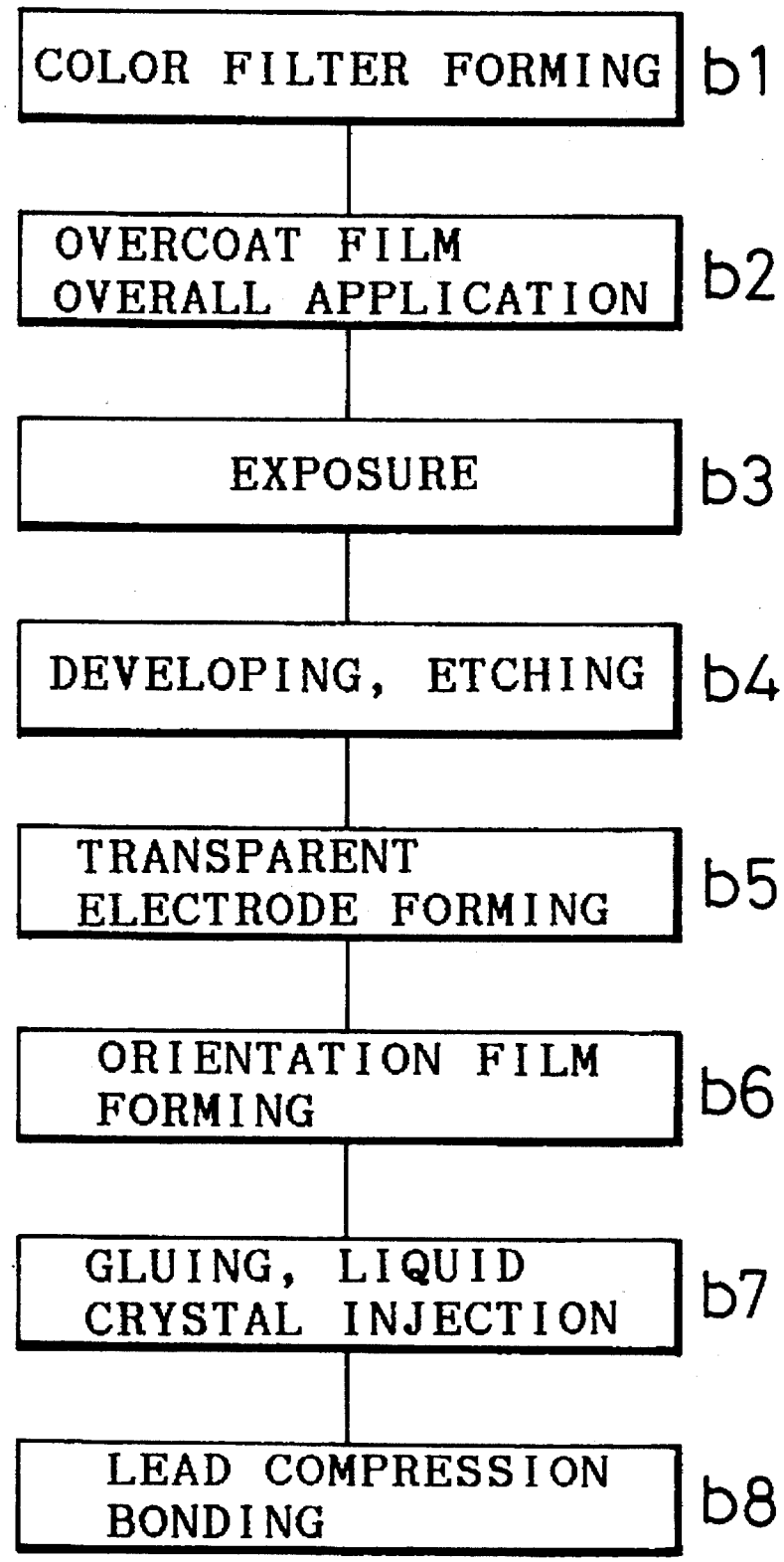
FIG. 5 is a process chart showing the flow of the process in FIG. 4.

FIG. 4 is a sectional view showing the manufacturing process of the color liquid crystal display device 1 by photo patterning method, and FIG. 5 is a process chart showing the flow of the process in FIG. 4.

First, at process step b1 in FIG. 5, as shown in FIG. 4 (A), color filters 8 of three primaries, red (R), green (G) and blue (B), are successively formed by electrodeposition or other methods on the surface 4a of the glass substrate 4.

At process step b2, as shown in FIG. 4 (B), a photosensitive organic overcoat film 9 (film thickness about 2 to 3 μm) is applied on the entire surface of the glass substrate 5 by means of spin coater or the like.

At process step b3, as shown in FIG. 4 (C), covering with a pattern mask 18, the surface of the overcoat film 9 is exposed to ultraviolet rays.

At process step b4, as shown in FIG. 4 (D), by developing and etching by using an organic solvent or the like, the overcoat film 9 is selectively formed on the display part 10 and its vicinity.

Thus, process step b5 through process step b8 are the same as process step a3 through process step a6 in FIG. 3, and FIG. 4 (E), (F), (G), (H) are same as FIG. 2 (C), (D), (E), (F), and hence their explanations are omitted.

In the color liquid crystal display device 1 of the embodiment, the overcoat film 9 is formed only in the display part 10 of the liquid crystal cell 2 and its vicinity, and not formed in the seal part 17 nor electrode terminal part 15. However, it is allowed that the overcoat film 9 is formed only in either one of the seal part 17 or the electrode terminal part 15, and other embodiments are shown below. In the following embodiments, the same reference numbers as in the embodiment in FIG. 1 denote same or corresponding parts as in the embodiment in FIG. 1.

Figure 6:
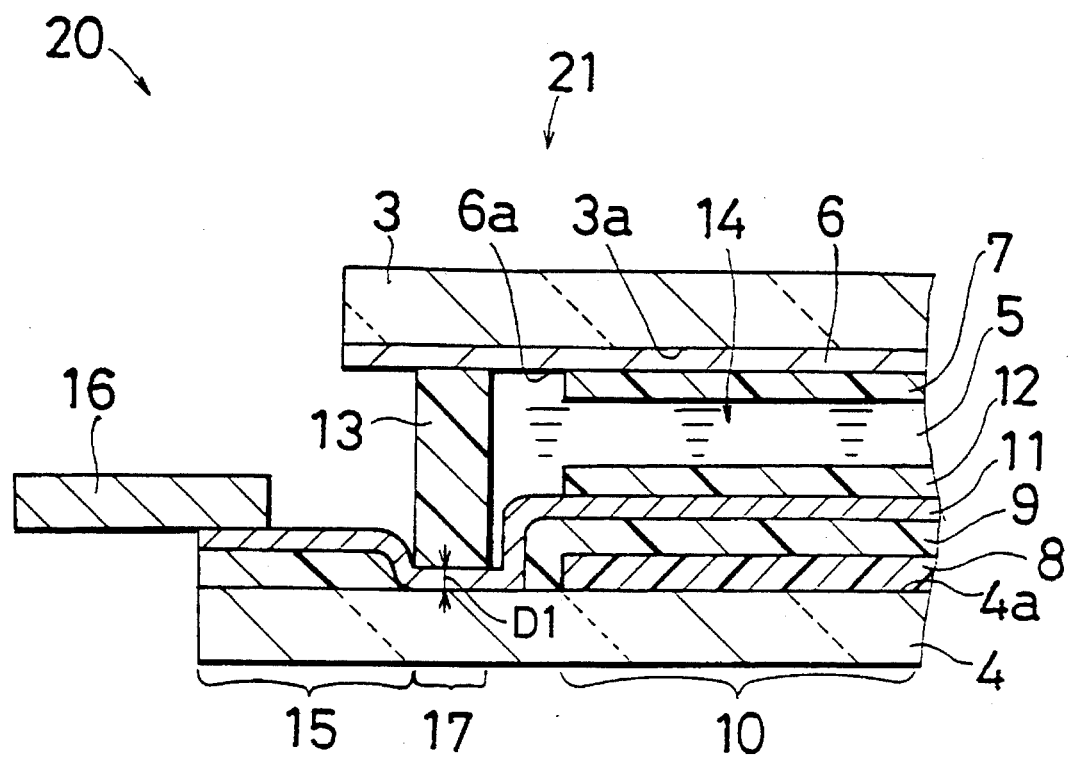
FIG. 6 is a sectional view of a color liquid crystal display device 20 in other embodiment of the invention.

FIG. 6 is a sectional view of a color liquid crystal display device 20 in other embodiment of the invention. The color liquid crystal display device 20 basically similar to the color liquid crystal display device 1 in FIG. 1, except that the overcoat film 9 is formed in the display part 10 and electrode terminal part 15 and not formed only in the seal part, which is different from the color liquid crystal display device 1 in FIG. 1.

According to the embodiment in FIG. 6, the film thickness (D1) between the seal member 13 and glass substrate 4 is no longer fluctuating and is uniform, so that the cell gap near the seal member 13 is uniform, which prevents lowering of display quality such as light penetration and uneven lighting.

Figure 7:
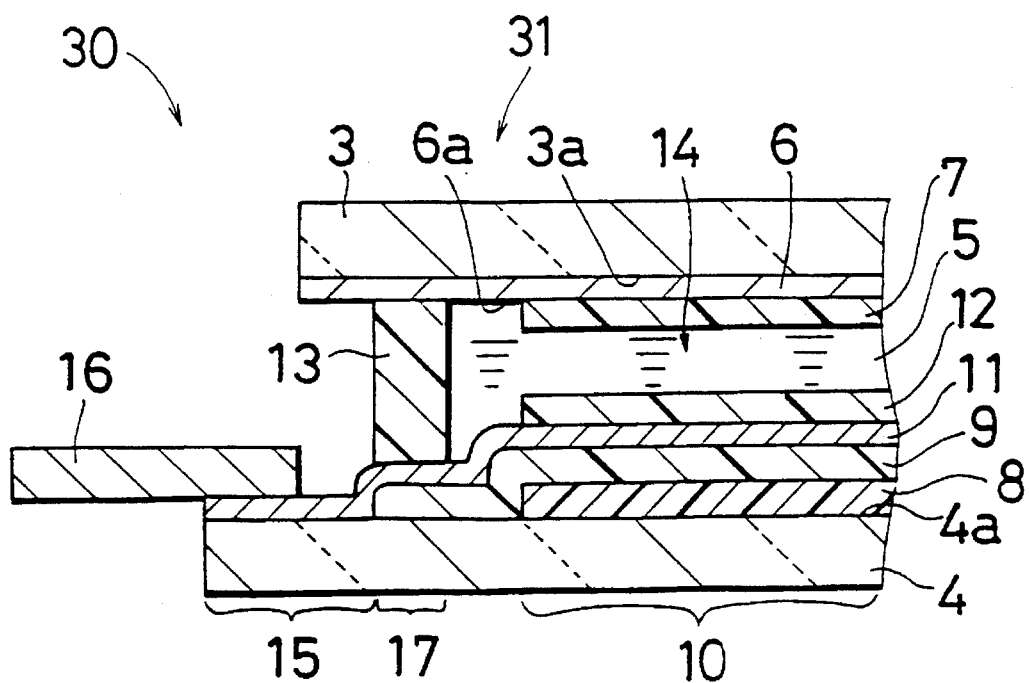
FIG. 7 is a sectional view of a color liquid crystal display device 30 in a further different embodiment of the invention.
Figure 8:
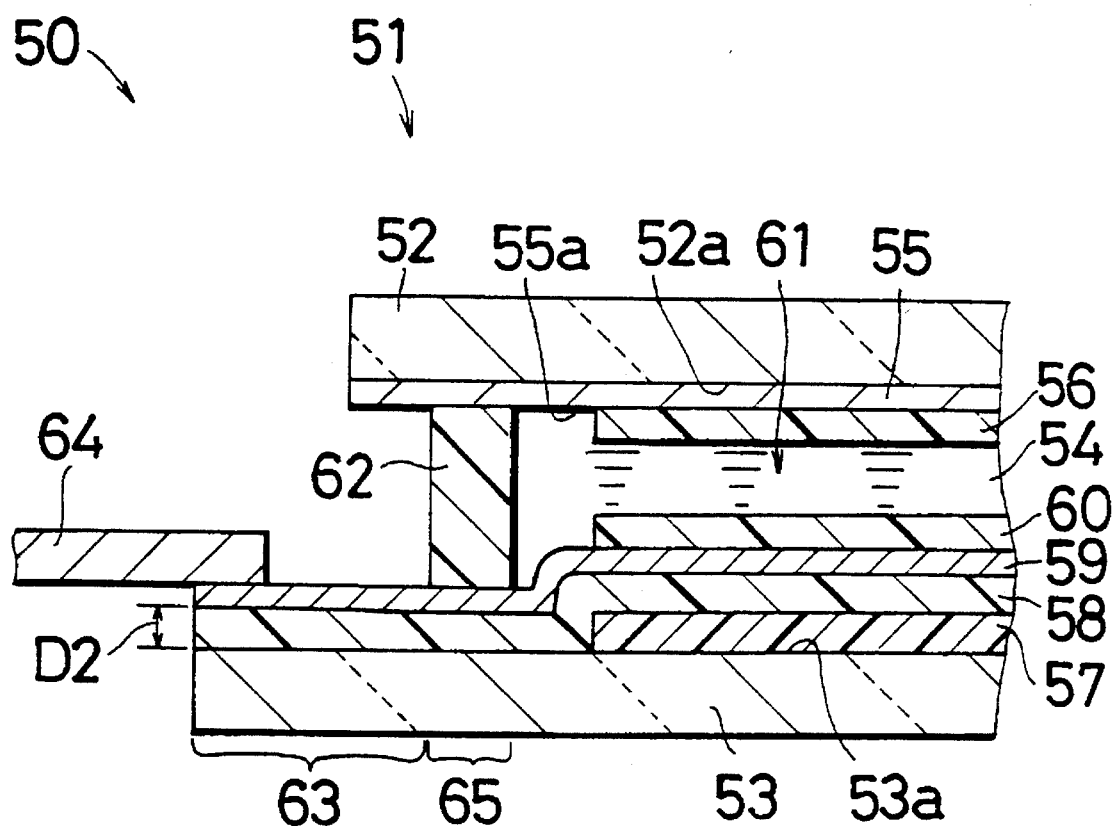
FIG. 8 is a sectional view of a conventional color liquid crystal display device 50.

FIG. 7 shows a sectional view of a color liquid crystal display device 30 in a further different embodiment of the invention. The color liquid crystal display device 30 is basically similar to the color liquid crystal display device 1 in FIG. 1, except that the overcoat film 9 is formed in the display part 10 and seal part 17 and not formed only in the electrode terminal part 15, which is different from the color liquid crystal display device 1 in FIG. 1.

In the embodiment shown in FIG. 7, the adhesion of the transparent electrodes 11 in the electrode terminal part 15 is fortified, and the resistance of the electrode terminal part 15 against flaw or impact is enhanced and peeling of the transparent electrodes 11 in the electrode terminal part 15 is prevented, so that the productivity and reliability are enhanced. Furthermore, in the manufacturing process, for example, if disconnection of the lead 16 compression bonded to the electrode terminal part 15 should occur, the transparent electrodes are hardly separated, so that the lead 16 can be compression-bonded to the transparent electrodes 11. Therefore, the length of the electrode terminal part 15 in the outward direction can be shortened, so that the device may be composed in a compact design.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A color liquid crystal display comprising:
   an upper light permeable substrate having a first transparent electrode and a first orientation film formed on a surface thereof;
   a lower light permeable substrate consisting at least of a display portion, a seal portion provided at a periphery of said display portion, and an electrode terminal portion extending further outward of said seal portion;
   a seal member disposed between said upper light permeable substrate and said seal portion of said lower light permeable substrate;
   a color filter formed on a surface of said display portion;
   a single layer overcoat film formed over said color filter;
   a second transparent electrode formed over said overcoat film and over said display portion, seal portion, and said electrode terminal portion of said lower light permeable substrate; wherein
   said single layer overcoat film being formed only over said display portion and said electrode terminal portion.

2. A color liquid crystal display comprising:
   an upper light permeable substrate having a first transparent electrode and a first orientation film formed on a surface thereof;
   a lower light permeable substrate consisting at least of a display portion, a seal portion provided at a periphery of said display portion, and an electrode terminal portion extending further outward of said seal portion;
   a seal member disposed between said upper light permeable substrate and said seal portion of said lower light permeable substrate;
   a color filter formed on a surface of said display portion;
   a single layer overcoat film formed over said color filter;
   a second transparent electrode formed over said overcoat film and over said display portion, seal portion, and said electrode terminal portion of said lower light permeable substrate; and wherein
   said single layer overcoat film being formed only over said display portion and said seal portion.

* * * * *